United States Patent [19]

Wang et al.

[11] Patent Number: 5,557,684

[45] Date of Patent: Sep. 17, 1996

[54] SYSTEM FOR ENCODING IMAGE DATA INTO MULTIPLE LAYERS REPRESENTING REGIONS OF COHERENT MOTION AND ASSOCIATED MOTION PARAMETERS

[75] Inventors: John Y. A. Wang; Edward H. Adelson, both of Cambridge, Mass.

[73] Assignee: Massachusetts Institute of Technology, Cambridge, Mass.

[21] Appl. No.: 464,108

[22] Filed: Dec. 27, 1994

Related U.S. Application Data

[63] Continuation of Ser. No. 31,642, Mar. 15, 1993, abandoned.

[51] Int. Cl.$^6$ ........................................................ G06K 9/36
[52] U.S. Cl. ............................................ 382/107; 382/236
[58] Field of Search ..................................... 382/232, 236, 382/239, 107, 173, 180; 348/402, 407, 412, 413, 415, 416; H04N 7/36

[56] References Cited

U.S. PATENT DOCUMENTS 5,214,504   5/1993   Toriu ........................................ 358/136

OTHER PUBLICATIONS

Sam Liu et al., Segmentation–Based Coding of Motion Difference and Motion Field Images For Low Bit–Rate Video Compression, 1992 IEEE, pp. III–525–528.

Bruce D. Lucus et al., An Iterative Image Registration Technique with an Application to Stereo Vision, Computer Science Department, Carnegie–Mellon University, Pittsburgh, Pennsylvania, pp. 121–130.

Lenz et al., Image Sequence Coding Using Scene Analysis And Spatio–Temporal Interpolation, NATO ASI Series, vol. F2, 1983 pp. 265–274.

Nicolas et al., Region–Based Motion Estimation Using Deterministic Relaxation Schemes For Image Sequence Coding, Sep. 1992, pp. 111–265–268.

Irani et al., Image Sequence Enhancement Using Multiple Motions Analysis, Dept. of Computer Science, The Hebrew University of Jerusalem, Techincal Report 91–15, Dec. 1991, pp. 2–26.

Darrell & Pentland : "Robust Estimation of a Muti–Layered. . ." Oct. 1991, IEEE, pp. 173–178.

*Primary Examiner*—Leo Boudreau
*Assistant Examiner*—Andrew W. Johns
*Attorney, Agent, or Firm*—Cesari and McKenna

[57] ABSTRACT

A system stores images as a series of layers by determining (i) the boundaries of regions of coherent motion over the entire image, or frame, sequence; and (ii) associated motion parameters, or coefficients of motion equations, that describe the transformations of the regions from frame to frame. The system first estimates motion locally, by determining the movements within small neighborhoods of pixels from one image frame i to the next image frame i+1, to develop an optical flow, or dense motion, model of the image. Next, the system estimates the motion using affine or other low order, smooth transformations within a set of regions which the system has previously identified as having coherent motion, i.e., identified by analyzing the motions in the frames i–1 and i. It groups, or clusters, similar motion models and iteratively produces an updated set of models for the image. The system then uses the local motion estimates to associate individual pixels in the image with the motion model that most closely resembles the pixel's movement, to update the regions of coherent motion. Using these updated regions, the system iteratively updates its motion models and, as appropriate, further updates the coherent motion regions, and so forth. The system then does the same analysis for the remaining frames. The system next segments the image into regions of coherent motion and defines associated layers in terms of (i) pixel intensity values, (ii) associated motion model parameters, and (iii) order in "depth" within the image.

29 Claims, 11 Drawing Sheets

SYSTEM FOR ENCODING IMAGE DATA INTO MULTIPLE LAYERS REPRESENTING REGIONS OF COHERENT MOTION AND ASSOCIATED MOTION PARAMETERS

This application is a continuation of Ser. No. 08/031,642, filed Mar. 15, 1993, now abandoned.

FIELD OF THE INVENTION

This invention relates generally to image coding, and in particular, to a mechanism for compressing image data for storage, transmission and decoding.

BACKGROUND OF THE INVENTION

A related application entitled Layered Representation For Image Coding, Ser. No. 07/888,801 to Edward H. Adelson, which is incorporated herein by reference, describes an image compression system which represents an image as a series of layers ordered by "depth" in the image. This system represents an image sequence by including in each of the layers information relating to how that layer should be manipulated, or transformed, over the time span of the image sequence.

A layer consists of a series of data maps, each of which relates to an object or a portion of an object which has motion which is significantly different from that of any other object in the image. Each map consists of a set of data for discrete two dimensional locations, with some maps including time as a third dimension. The maps define for each location (i) the intensity at a fixed instant in time, for example, the start of a sequence, (ii) the attenuation over time, and (iii) the velocity over time. Optional maps, such as a contrast change map which describes how the intensity map of the corresponding layer should be multiplied to create contrast transitions over time, a blur map which adds motion blur or focus blur to one or more locations, and so forth, may be included, as necessary, to describe changes in the associated objects over time. The image sequence is re-created, or decoded, from the layers by combining them, in order, and appropriately manipulating, i.e., "warping," them over time.

Various methods may be used to define the objects, i.e., to determine their boundaries. One may use recursive multiple motion analysis, one example which is a dominant motion analysis technique, which iteratively assumes there is a single dominant motion in an image sequence and based on that assumed motion defines a single (dominant) object. This dominant object is then masked or excluded from the image, and the remaining regions of the image are again analyzed, assuming a second dominant motion. If a second object is identified, it too is excluded from the image and the image can again be warped and subjected to further motion analysis. This type of dominant motion analysis is discussed in a paper entitled *Image Sequence Enhancement Using Multiple Motions Analysis,* by Irani and Peleg. The technique correctly identifies a dominant object if there is a single, clearly dominant motion in the image. If, however, there are multiple dominant motions in the image, the technique cannot accurately identify the objects.

Another technique for determining objects in an image is block matching. The motions of rectangular blocks of pixels are determined from one frame to another and motion vectors are assigned to the blocks. Blocks with the similar motions are then considered parts of the same object. All objects, even objects with irregular shapes, are represented by a combination of these blocks. While blocks of varying sizes may be used to designate an object, as discussed in a paper entitled *Segmentation—Based Coding of Motion Difference and Motion Field Images For Low Bit-Rate Video Compression,* by Liu and Hayes, these blocks cannot entirely accurately represent the irregularly shaped objects.

SUMMARY OF THE INVENTION

The invention is a system, and a method of operating the system, for simultaneously determining, for images which contain multiple objects, (i) the boundaries of regions of coherent motion over an entire image, or frame, sequence; and (ii) associated motion parameters, or coefficients of motion equations, which describe the transformations of the regions from frame to frame. If the motion equations are, for example, affine transformations, the motion of an entire region of the image from one frame to the next, is described by a set of six affine parameters. Using this information, the system encodes the image sequence into a series of layers, one for each region, with the velocity maps compressed to sets of motion parameters.

The system does not require that an image have a dominant motion, it requires only that the motions in the image be such that they can be described by the selected set of motion equations. For example, affine transformations describe smooth motions, and thus, highly compiles movement must be treated as an error condition. The system also does not require that the objects have regular shaped such as can be described by, for example, rectangular blocks. The system assigns individual pixels to the regions of coherent motion, and thus, can describe objects of essentially any shape.

Briefly, the system first estimates motion locally, by determining the movements within small neighborhoods of pixels from one image frame i to the next image frame i+1 to develop an optical flow, or dense motion, model of the image. Next, it estimates the motion using affine or other low order, smooth transformations within a set of regions which the system has previously identified as having coherent motion, i.e., identified by analyzing the motions in the frames i–1 and i. The system thus formulates a motion model for each of the regions.

It next groups, or clusters, similar motion models and iteratively produces an updated set of models for the image. The system then uses the local motion estimates to associate individual pixels in the image with the motion model which most closely resembles the pixel's movement, to update the regions of coherent motion. Using these updated regions, the system iteratively updates its motion models and, as appropriate, further updates the coherent motion regions, and so forth, until the pixel assignments do not change significantly between iterations.

The system next analyses the motions associated with frames i+1 and i+2, using as its initial estimates of the regions of coherent motion the set of updated regions identified in its analyses of frames i and i+1. The system then repeats the procedures for local motion estimation, regional motion estimation and pixel assignment until it identifies a set of updated regions for this frame pair for which the pixel assignments do not change significantly between iterations. The system then uses this set of updated regions in its analysis of the next pair of frames, and so forth, until each of the frame pairs in the sequence has been analyzed.

The system now has segmented the image into regions of coherent motion and it must "extract" or define associated layers in terms of (i) pixel intensity values, (ii) associated motion model parameters, and (iii) order in "depth" within the image. The ordering of the layers preserves occluding and opacity relationships, since it places a layer associated with a foreground object now in front of a layer associated with an object in the background.

To extract the layer, the system must determine pixel intensity information for each of the locations in the layer. Accordingly, the system determines, in each of the frames, the motions of the individual pixels associated with the region of interest. The system selects a frame, for example, the frame in the middle of the sequence, and aligns the pixels in the region of interest in each of the other frames with the corresponding region in the selected frame, by following the movements of the pixels from frame to frame using the associated motion parameters. At the same time, the system modifies the parameters, i.e., combines them appropriately, so that they describe the motion between the region in a given frame and the same region in the selected frame, as discussed below. The system then determines for each pixel location in the layer an intensity value which is based on a combination of the intensity values of the aligned pixels. It thus accumulates these intensity values, i.e., combines them over time, and calculates the median of each combination. It then assigns the median values to the corresponding pixel locations in the layer. The result is at a layer intensity map. The system them repeats the aligning and pixel intensity evaluation procedures for each of the remaining layers, and thus, develops for each layer an associated intensity map.

The intensity values of pixels which are occluded in a particular frame do not contribute to the layer intensity value calculations. The system counts the number of pixels used in each layer intensity value calculation, and orders the layers such that those layers with greater numbers of pixel contributions are placed in front of layers with smaller numbers of contributions. The system then stores the intensity map, the modified motion parameters and the ordering information as a layer.

To decode the stored layers into the image sequence, a decoder orders them in accordance with the ordering information to produce an image and then warps the image in accordance with the stored motion parameters to produce the sequence of image frames. Since every pixel location in a layer is assigned an intensity value during extraction, the sections of a region which are occluded during a portion of the sequence are recovered and represented in the intensity map. Accordingly, occluding objects may be removed from the sequence, by omitting the corresponding layer(s), and a sequence with the otherwise partially occluded object in full view can be produced. Using the layers, a system can also produce image sequences with "super resolution" or with different frame rates, since it can accurately interpolate intervening pixels and/or intervening frames based on the calculated movements of the coherent motion regions and the individual pixels within those regions throughout the sequence.

BRIEF DESCRIPTION OF THE DRAWINGS

The above and further advantages of the invention may be better understood by referring to the following description in conjunction with the accompanying drawings, in which.

DETAILED DESCRIPTION OF AN ILLUSTRATIVE EMBODIMENT

Figure 1:
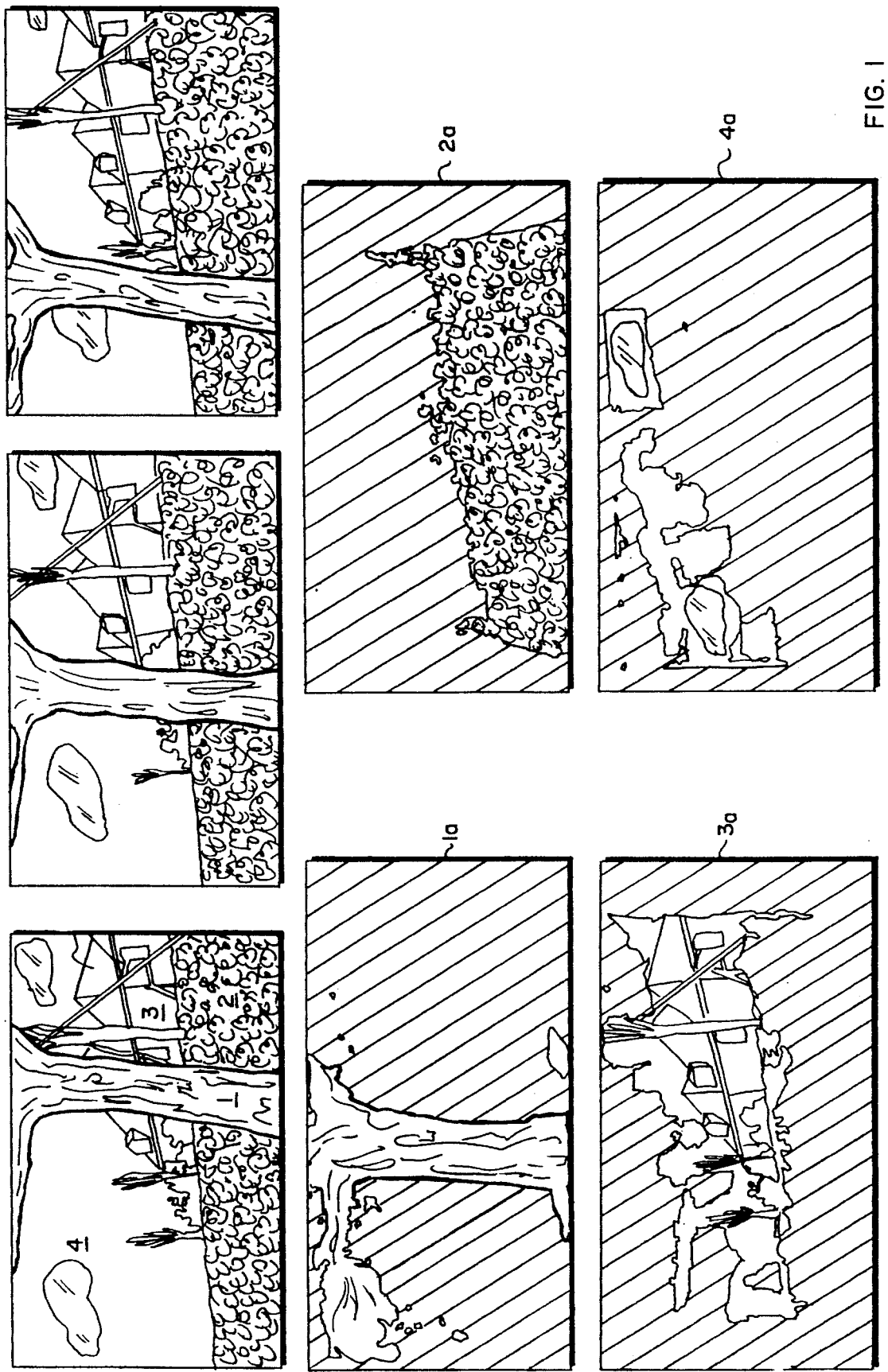
FIG. 1 depicts three frames of an image sequence entitled Flower Garden, and associated image layers.

FIG. 1 depicts the images in three frames of a sequence of frames entitled *Flower Garden*, produced by the Motion Picture Expert Group (MPEG). These frames will be referred to in explaining in more detail the concept of image layers.

The frames, which are part of a sequence of frames produced by a camera moving across a scene, include a foreground tree 1, a middle-ground flower garden 2 and a background row of houses 3. The objects such as the tree 1, the flower garden 2 and the row of houses 3 have temporal coherency within the frame sequence, that is, they change shape or texture patterns slowly over time. They also have spatial coherency within the frame sequence, that is, they change shape or texture patterns according to smooth transformations over the sequence of frames, though different portions may be occluded in various frames and related information may be included or excluded in later frames. The tree 1, the flower garden 2 and the row of houses 3, undergo different respective motions over the frame sequence, because of their different positions relative to the camera.

The depicted image can be segmented into four layers 1a–4a, one for each of the tree 1, the house 2, the flower garden 3 and the essentially motionless background, i.e., the sky 4. The sequence of frames can then be represented by a composite of these layers 1a–4a, with each layer transformed in accordance with its associated motion parameters. The image sequence can thus be represented in compressed form by the layers, the deformities of the layers and the mathematical expressions describing their transformations over time. A layer is like an animator's cel, which may, for example, be displaced or translated relative to a stationary, or moving, background to depict movement of a character or an object drawn in the cel. However, unlike the animator cels the layers can be used to depict motions which are more complex than the translations of cel animation.

Segmenting the image into layers requires determining the boundaries of multiple objects, that is, multiple regions of coherent motion, while at the same time determining the motions of these regions. We use affine transformations to represent the motions although other sets of smooth, low-ordered functions may be used. Affine motion models define motion as translation, shearing, and zooming or any combination of thereof, using six parameters. Rotation, for example, is a combination of vertical and horizontal shearing.

Figure 2:
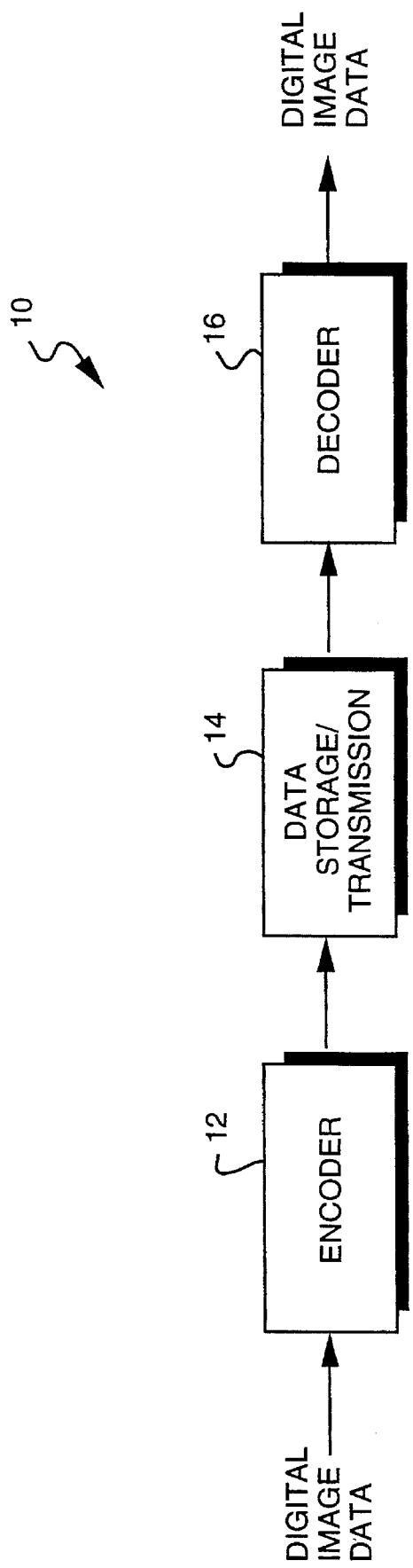
FIG. 2 is a functional block diagram of a system for encoding and decoding an image as a series of layers.

Referring now to FIG. 2, a system 10 for encoding, and thus compressing, data and decoding the compressed data to re-create the image includes an encoder 12 which encodes and compresses digital image data for a sequence of image frames into (i) a series of ordered layers, with each layer representing a region of coherent motion in the image, and (ii) associated motion parameters which describe the transformations of the layers from one frame to the next. A data storage and transmission device 14 stores the data representing the various layers and the associated motion parameters and transmits that information to a decoder 16 which reassembles the various layers to create an image and, to recreate the sequence of images, warps the various layers in accordance with the stored motion parameters. The decoder 14 then transmits the decoded frame sequence to a video display unit (not shown) for display.

Figure 3:
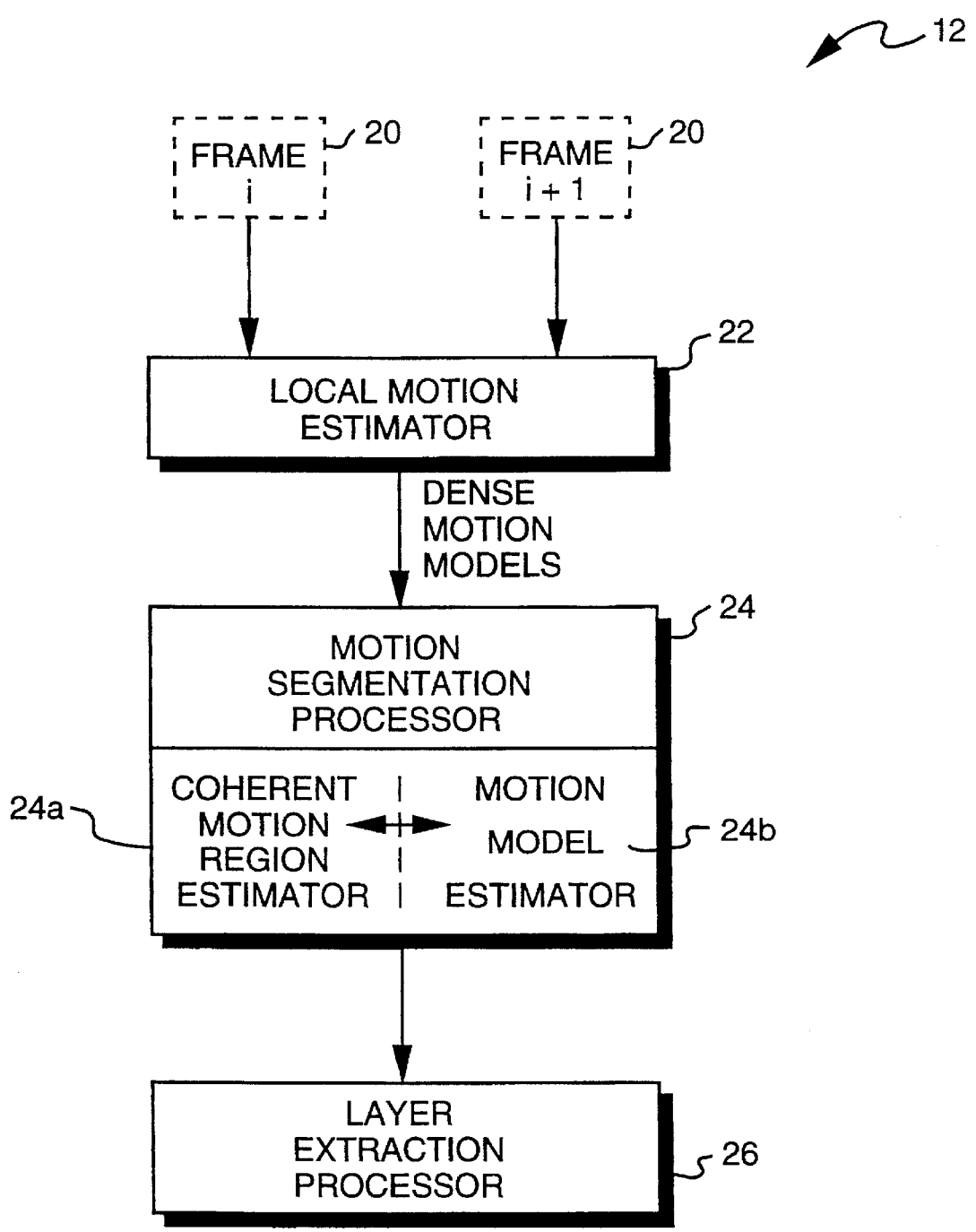
FIG. 3 is a functional block diagram of an encoder included in the system of FIG. 2.
Figure 4:
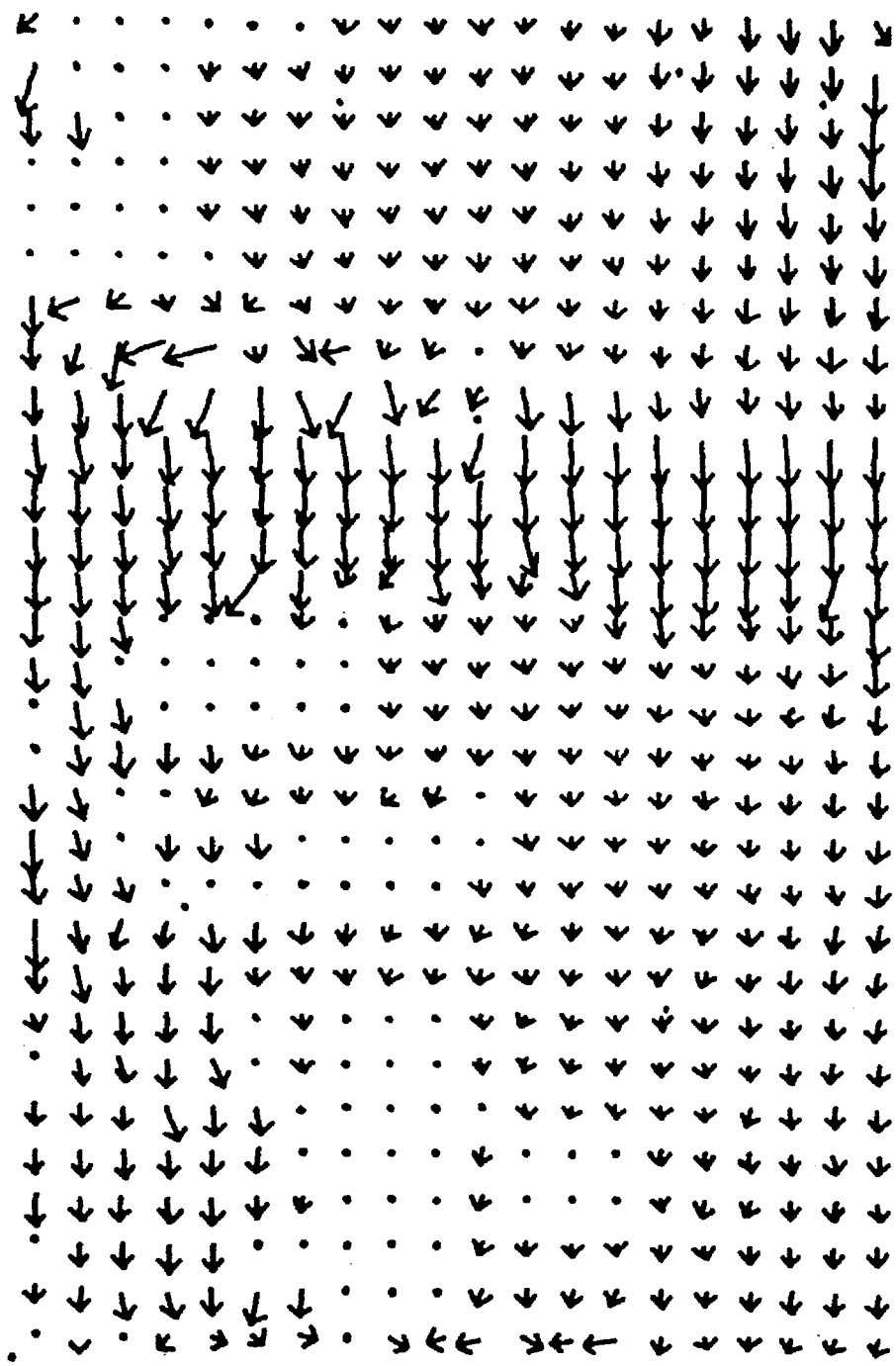
FIG. 4 depicts a dense motion model of a frame depicted in FIG. 1.
Figure 5:
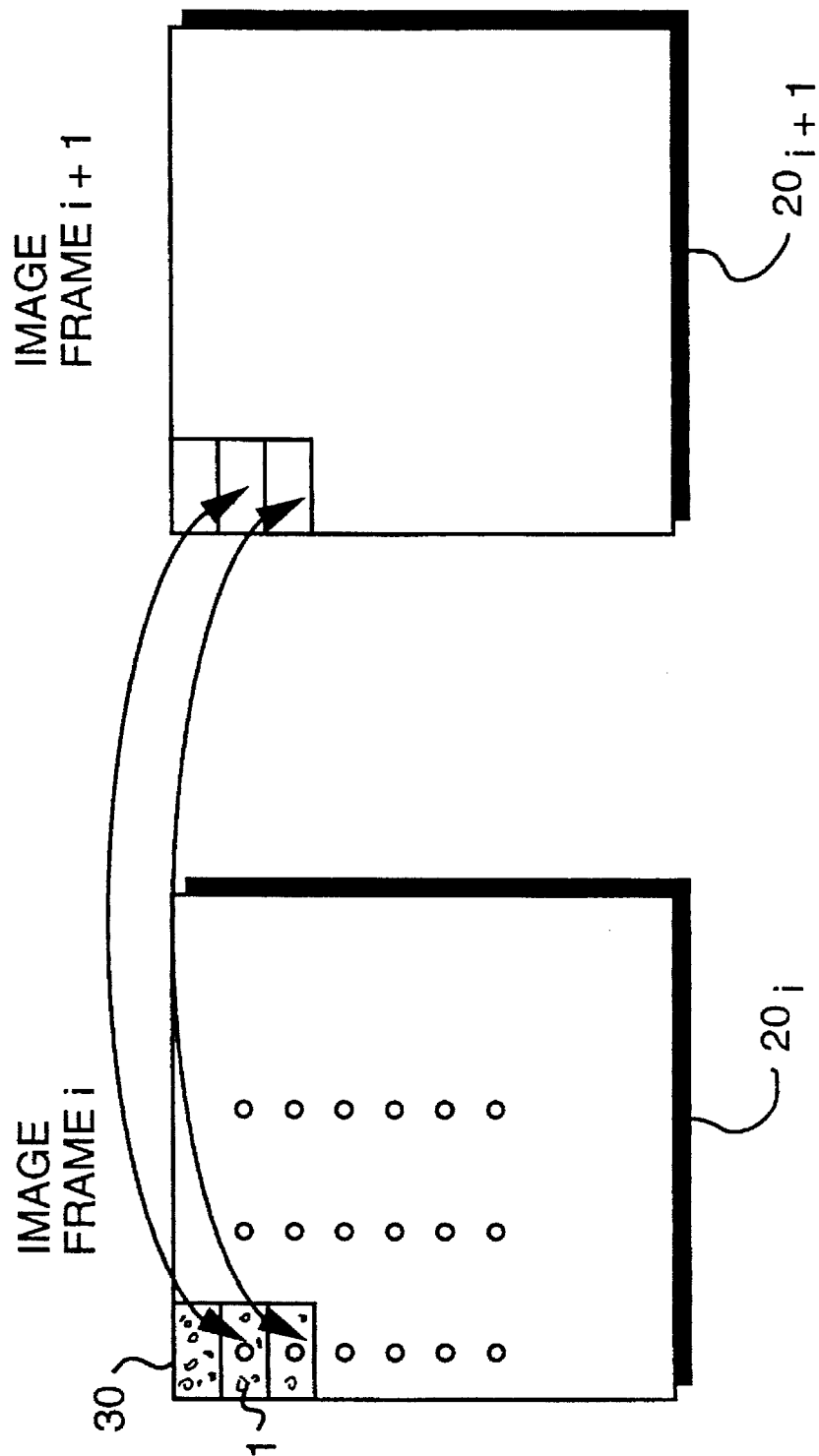
FIG. 5 illustrates pixel neighborhoods used in determining local motion.
Figure 6A:
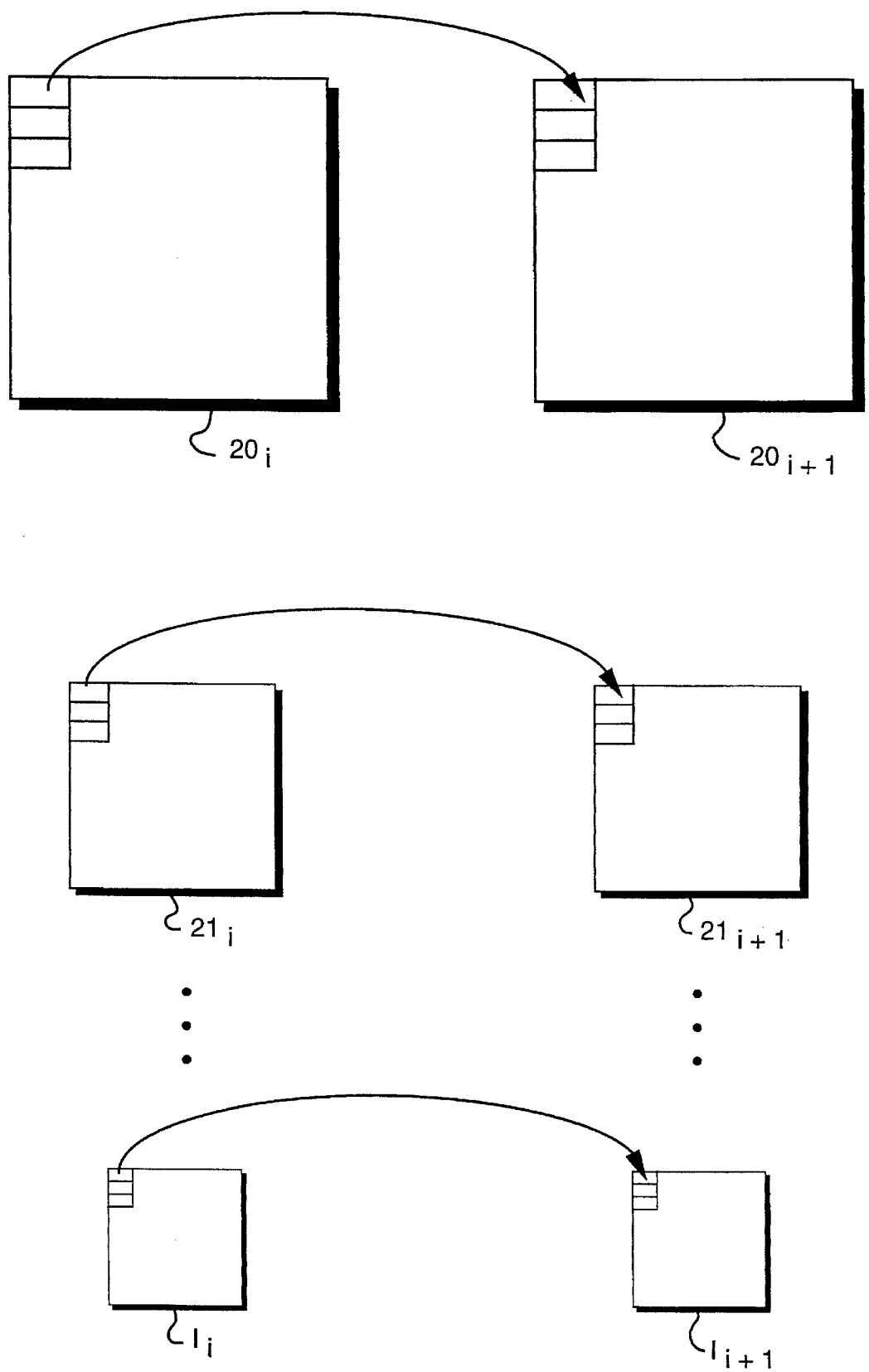
FIGS. 6A–6B illustrate changes in images in a Gaussian pyramid.

Referring to FIG. 3, the encoder 12 includes a local-motion estimator 22 which estimates the movements within small arrays, or neighborhoods, of pixels between two consecutive frames i and i+1. The neighborhoods may, for example, be 3-pixel by 3-pixel arrays. For each neighborhood the estimator 22 produces a velocity vector representing the average motion and assigns that vector to the pixel in the center of the neighborhood. It then selects an overlapping neighborhood associated with a next pixel, determines an average motion vector and assigns the vector to the pixel in the center of the neighborhood, and so forth, until the estimator assigns a motion vector to every pixel in the image. The result is an optical flow or dense motion model of the image, as depicted in FIG. 4. The operations of the local motion estimator are discussed in more detail below with reference to FIGS. 5 and 6.

A motion segmentation processor 24 consists of a coherent-motion-region estimator 24a and a motion estimator 24b which operate together to simultaneously determine the regions of coherent motion in the image and a set of associated motion models for the regions. The motion estimator 24b estimates the motions in the regions of coherent motion identified by the coherent-motion-region estimator 24a and produces for each of these regions an estimated motion model, such as an affine motion model. The motion estimator 24b then groups similar models together and produces for each group a composite motion model. The coherent-motion-region estimator 24a next associates individual image pixels with these composite motion models, by assigning each pixel to the motion model which most closely resembles the pixel's local motion. The processor thus produces updated regions of coherent motion. Using these updated regions, the processor iteratively develops new motion models and updates the regions.

At the end of a predetermined number of iterations or after pixel assignments do not change significantly between iterations, which ever occurs first, the processor 24 stores the motion model parameters and information identifying the coherent motion regions in storage locations associated with the last frame of the pair, i.e., frame i+1. It also uses the identified coherent motion regions as initial estimates of the regions in its analysis of the next frame pair, namely, frames i+1 and i+2. The operations of the motion segmentation processor 24 are discussed in more detail below with reference to FIG. 7.

For each frame pair, the local-motion estimator 22 estimates local motion and assigns to each pixel a motion vector. The motion segmentation processor 24 then segments the associated image into coherent motion regions, following the procedures described above and using the regions identified for a previous frame pair as the initial estimates of the regions in this frame pair, until all the frame pairs in the sequence have been analyzed. The processors thus identify the regions which have coherent motion over the sequence of frames and determine, for each frame pair, a set of motion models which describe the motions of the respective regions from the first frame in the pair to the second.

A layer-extraction processor 26 combines the coherent region information and the associated motion model information for all of the frames and produces one layer for each region. The processor first selects a frame in the middle of the sequence and determines for each preceding and subsequent frame how the various coherent motion regions must be transformed to align with the corresponding regions in the selected frame. The processor thus combines the motion parameters associated with a region in one frame with the motion parameters associated with the same region in the frames between that frame, and the selected frame to produce a modified set of motion parameters.

Using these modified motion parameters, the processor 26 aligns the corresponding region in each of the frames with the region of the selected frame and determines a composite pixel intensity value for every pixel location in the region. The system then uses these values to produce a layer intensity map.

The processor 26 ignores the intensity values of occluded pixels when it determines the composite intensity values. Accordingly, layers associated with partially occluded objects combine fewer pixel values to determine the composite intensity values. The processor orders the layers by counting the number of pixel contributions. Each layer thus consists of (i) a pixel intensity map, (ii) a set of modified motion parameters which defines the motion of the layer from the selected frame to each of the other frames in the sequence, and (iii) layer ordering (depth) information which indicates how this layer is composited with the other layers to decode, i.e. reproduce, the image. As necessary, the processor 24 also includes in each layer information relating to attenuation, motion blur, and so forth. The processor 26 then sends the layer information to the data storage and transmission device 14 (FIG. 1) for storage and/or transmission. The operations of the layer extraction processor 26 are discussed in more detail below with reference to FIG. 9.

By starting with local motion estimates and returning to these estimates to iteratively determine motion and the boundaries of associated regions of coherent motion, the system 10 approaches the problem of analyzing multiple motions in the entire image by performing multiple estimates of the single motions within multiple coherent regions of the image. This allows the system to represent the image data by a small number of layers and related motion parameters. The image information can thus potentially be stored with less memory and transmitted with less bandwidth than are required in prior known systems. A sequence of 30 frames, for example, can be represented by a few still images of the layers plus 6 parameters per frame per layer.

Referring now to FIGS. 3–6, the local-motion estimator 22 estimates local motion by determining the movement within a small array, or neighborhood, 30 of pixels 31 from one frame $20_i$ to the next frame $20_{i+1}$. Since no assumptions are made concerning the magnitude of the image movement, i.e., whether it small or large, the movement in each neighborhood is determined using a "coarse-to-fine" motion estimation technique to track large as well as small motion. In the preferred embodiment the estimator 22 uses a multiscale least-squares approach. Essentially, the local motion estimator 22 builds a Gaussian pyramid (FIG. 6A) for the images to "zoom" out from them, that is, produce lower and lower resolution representations of the image, until even large motions are detected as small ones. To avoid aliasing, the estimator blurs the images in the two frames by filtering them using a Gaussian filter. Next, it sub-samples, or takes a subset of the filtered data, for example, data from every other pixel location, to form a new set of images $21_i$ and $21_{i+1}$. The estimator may again filter and sub-sample the filtered data to produce even lower resolution images, and so forth, until it produces images $I_i$ and $I_{i+1}$ with appropriately low resolution.

The estimator 22 then estimates the small motion between corresponding neighborhoods of these new images $I_i$ and $I_{i+1}$, using a known gradient-based, least-square estimation. The estimator thus iteratively determines, for this low resolution neighborhood, a motion velocity vector h which represents a "disparity" between a curve F(x), which represents pixel intensity as a function of position in the neighborhood 30 in image $I_i$ and a curve G(x) which represents the pixel intensity as a function of position in the neighborhood 30 in image $I_{i+1}$. A two-dimensional least-square analysis provides the vector h, describing the displacement of G(X) from F(X), by iteratively solving the following equation:

$$h_{k+1} = h_k + \Sigma w(x) \frac{\partial}{\partial x} \frac{[F(x-h_k) + G(x)]}{2} [G(x) - F(x-h_k)]C^{-1}$$

where $C =$ $$\Sigma w \frac{[\partial}{\partial x} \frac{[F(x-h_k) + G(x)]^T}{2} \frac{\partial}{\partial x} \frac{[F(x-h_k + G(x)]}{2},$$

where $\partial f/\partial x$ is the gradient operator and w(x) is a weighting factor which reduces the contributions from pixels which are further from the pixel for which the motion is being estimated. A similar technique for detecting small motions, sometimes referred to as image "registration", is described in more detail an article entitled *An Iterative Image Registration Technique with an Application to Stereo Vision* by Lucas and Kanade, Image Understanding Workshop, April, 1981, pp. 121–130. The estimator 22 analyses motion by determining where the curve G(x) must have moved from to get to the new position, i.e., it analyses "from-warping." Accordingly, it uses a modification of the technique discussed in the Lucas and Kanade article, which analyses motion by analyzing where the curves are moving to—i.e. "to-warping." By analyzing motion using "from-warping", the estimator 22 can more accurately determine sub-pixel movements.

Figure 6B:
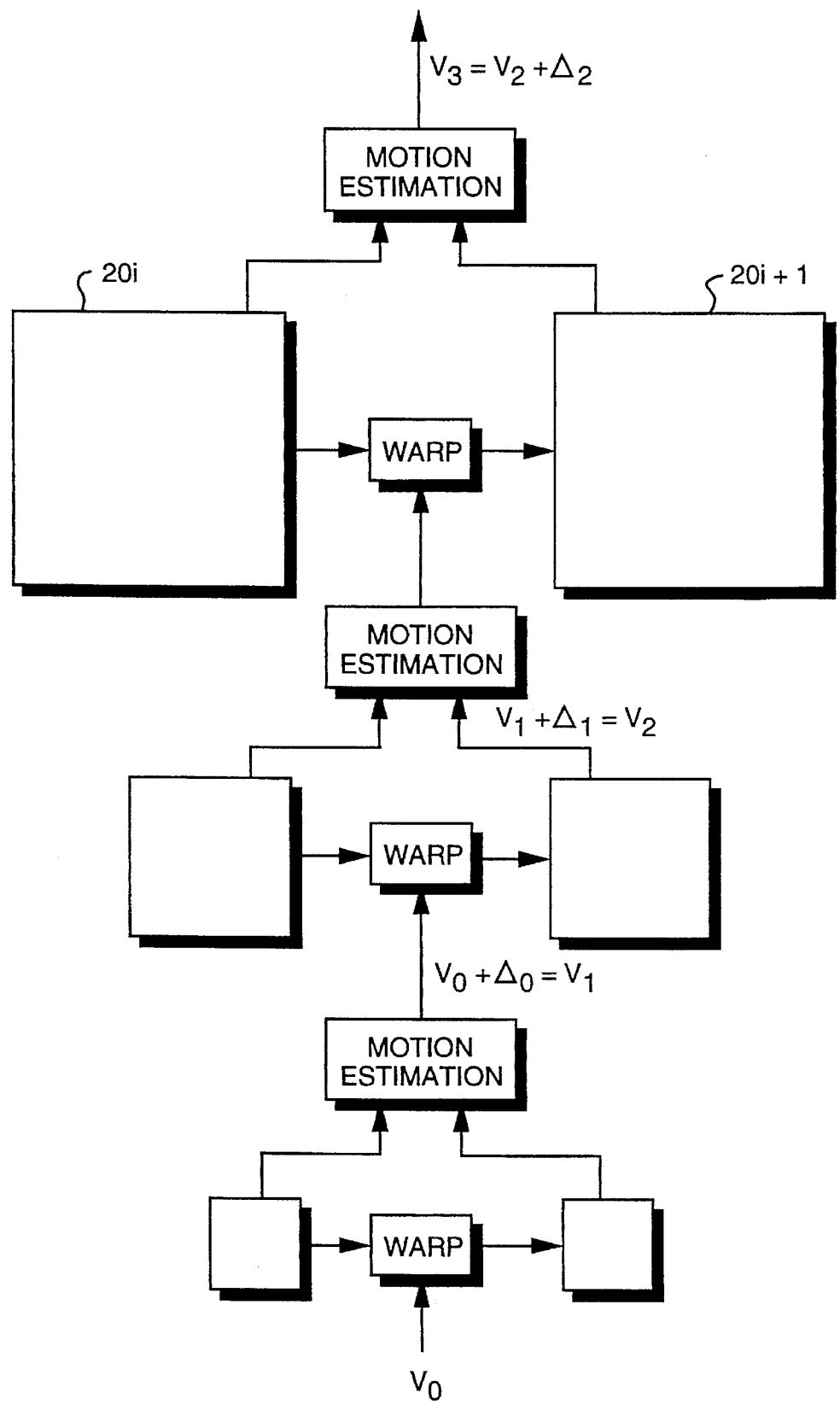

The motion information determined using the small motion analysis on images $I_i$ and $I_{i+1}$ is propagated up to the next highest level of the Gaussian pyramid, which analyzes motion using a higher resolution version of the images. The first image in this level is in essence shifted, i.e., warped, to a position which corresponds to the movement estimated at the lower resolution level, and the small motion analysis is again performed. Once a new estimate is obtained, it is propagated up to a next level of the pyramid, and motion at this level is analyzed, until the motion in the selected neighborhood of the original resolution image is determined. A three-level pyramid is illustrated in FIG. 6B.

This local motion analysis is performed for every pixel in the image to produce an optic flow or dense motion model (FIG. 4) of the image. The size of the neighborhoods should be selected so that small motion details are not lost, yet large motion can be accurately detected using this "coarse-to-fine" motion detection technique.

Figure 7:
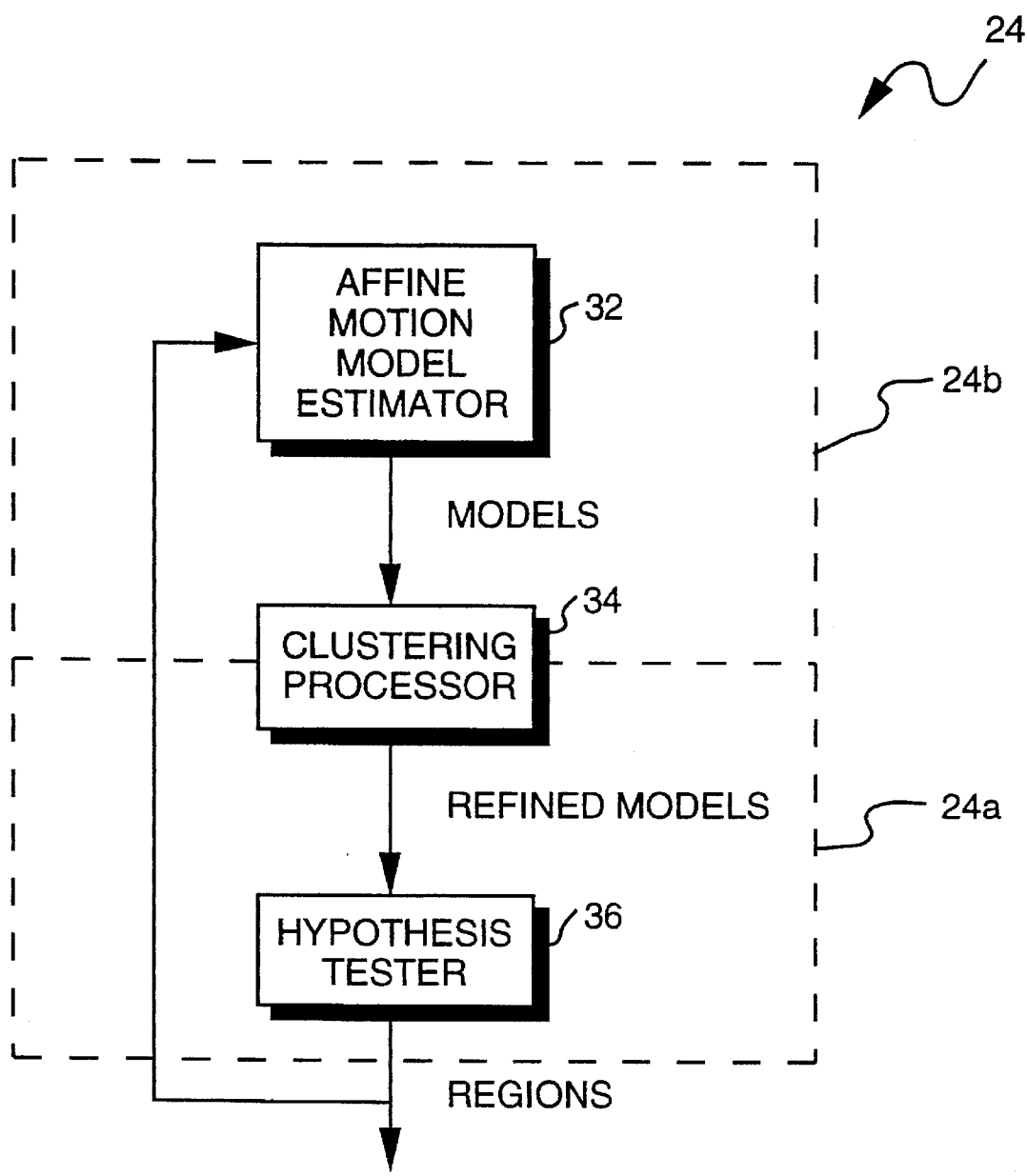
FIG. 7 is a functional block diagram of a motion segmentation processor included in the system of FIG. 2.

Referring now to FIG. 7, an affine motion model estimator 32, which is part of the motion model estimator 24b (FIG. 3), interprets the dense motion model generated by the local-motion estimator 24 (FIG. 3) and produces estimates of affine motion models for the coherent motion regions associated with the frame pair i, i+1. Since there are no initial constraints on the shapes of the objects, and thus, no first estimate of coherent motion regions, the processor uses a grid of r rectangular blocks each having dimensions of n-pixels by m-pixels, as a first estimate of coherent regions for frames 0 and 1 in the sequence. The processor then models the motion within each of these regions as an affine transformation of the form:

$$V_x = a_{x0} + a_{x1}x + a_{x2}y$$

$$V_y = a_{y0} + a_{y1}x + a_{y2}y$$

where $V_x$ and $V_y$ are, respectively, the x and y components of the motion velocity vector of a pixel at a location (x,y) and the $a_k$'s are the affine parameters representing respectively, translation, shearing and skewing in the x and y direction.

The estimator 32 uses linear regression to produce estimates of the affine motion parameters from the associated local motion vectors. To reduce computation, the regression is applied separately on each velocity component, since they are independent. If $H_i$ is the $i^{th}$ estimate of the affine parameters in the affine parameter space, with x and y components $H_{xi}$ and $H_{yi}$, and $\phi$ is the regressor vector:

$$H_i = [H_{yi} \ H_{xi}]$$

$$H_{xi}^T = [a_{x0i} \ a_{x1i} \ a_{x2i}]$$

$$H_{yi}^T = [a_{y0i} \ a_{y1i} \ a_{y2i}]$$

$$\phi^T = [1 \ x \ y]$$

and $$[H_{yi} \ H_{xi}] = [\Sigma_{Pi} \phi \phi^T]^{-1} \ \Sigma_{Pi}(\phi^T[V_y(x,y) \ V_x(x,y)])$$

where $P_i$ is the $i^{th}$ region in the image. This is essentially plane-fitting in velocity space.

After the affine parameter estimator 32 estimates the affine motion parameters for a region, and thus, formulates an estimated motion model for that region, it compares the model with the associated local motion estimates and determines the variance over the region. The estimator 32 then assigns to the model a confidence rating, which is the reciprocal of the variance. Estimates with low confidence ratings are considered "bad", and may be ignored. The bad estimates are typically associated with regions which include one or more object boundaries, since the two motions within these regions cannot ordinarily be matched with a single affine motion model.

The size of the initial regions is selected so as to be small enough to lower the probability that a single region will include an object boundary, and yet be sufficiently large to include enough data from which to formulate a reasonable estimate of the associated affine motion.

The affine parameter estimator 32 produces r motion models, one for each rectangular block, or region, of the imposed grid. Some of these models are associated with the same object, and should thus be similar. Accordingly, these models can be combined for a more accurate segmentation of the image.

Referring again to FIG. 6, a clustering processor 34 receives the parameters associated with the r affine motion models and selects a number, C, of most confident models as initial clustering "centers." Each of the centers must be separated from every other center by at least a minimum normalized distance in affine parameter space.

Using a modified k-means clustering technique, the clustering processor 34 groups together the models which are within a predetermined radius of each selected center, and thereby forms C initial clusters. It then ignores clusters which contain fewer than a predetermined number of models, and produces for the remaining clusters new estimates of the cluster centers. The processor thus averages for a given cluster the corresponding affine parameters associated with each of the models in the cluster, and uses these average values as the parameters of a new center. The averages may be weighted by the confidence ratings associated with the models, as appropriate.

If two of the new centers are closer than a predetermined separation distance in the affine parameter space, the associated clusters are merged, and a new center for the merged cluster is determined. When no further changes in the clustering can be made, the clustering processor 34 sends the resulting q, $q \leq r$, affine motion models to a hypothesis tester 36, which tests the pixels individually against each of the models to determine a best pixel-to-model fit, i.e., to determine which model most closely represents the pixel's estimated local motion.

Using hypotheses testing, the tester 36 associates each pixel with the model which minimizes the error at the pixel location by selecting the model which minimizes:

$$(V_{actual}(x,y) - V_{Hi}(x,y))^2$$

where $V_{actual}(x,y)$ is the local*motion vector field and $V_{Hi}$ is the affine motion field corresponding to the $i^{th}$ model, or hypothesis, and models i=0,1 . . . , q are tested. A pixel at location x,y is associated with the model which exhibits at the same location, a motion which most closely resembles the pixel's local motion. If the determined error for every model exceeds a predetermined minimum value, the tester 36 leaves the pixel unassigned. The tester 36 then segments the image pixel-by-pixel into q regions, and one or more unassigned pixels. The tester may assign an unassigned pixel by comprising the change in intensity of the pixel between frames with the changes predicted by the various models, and assigning the pixel to the model which, within a predetermined error range, most closely predicts the pixel's intensity. The system can thus assign a pixel to a region even if the local motion estimate is bad.

These q regions are used by the affine parameter estimator 32 to determine updated affine parameters. The clustering processor 34 and hypothesis tester 36, respectively, perform clustering and hypothesis testing procedures based on the updated affine parameters, to produce further updated regions. These further updated regions are again used to produce estimated affine motion models, which are again clustered and tested, and so forth, until either the regions do not change significantly between iterations or some maximum number of iterations are performed. The final updated regions produced by this iterative process for a pair of frames are used as the initial regions for the motion segmentation of the images of the next frame pair in the sequence.

Figure 8A:
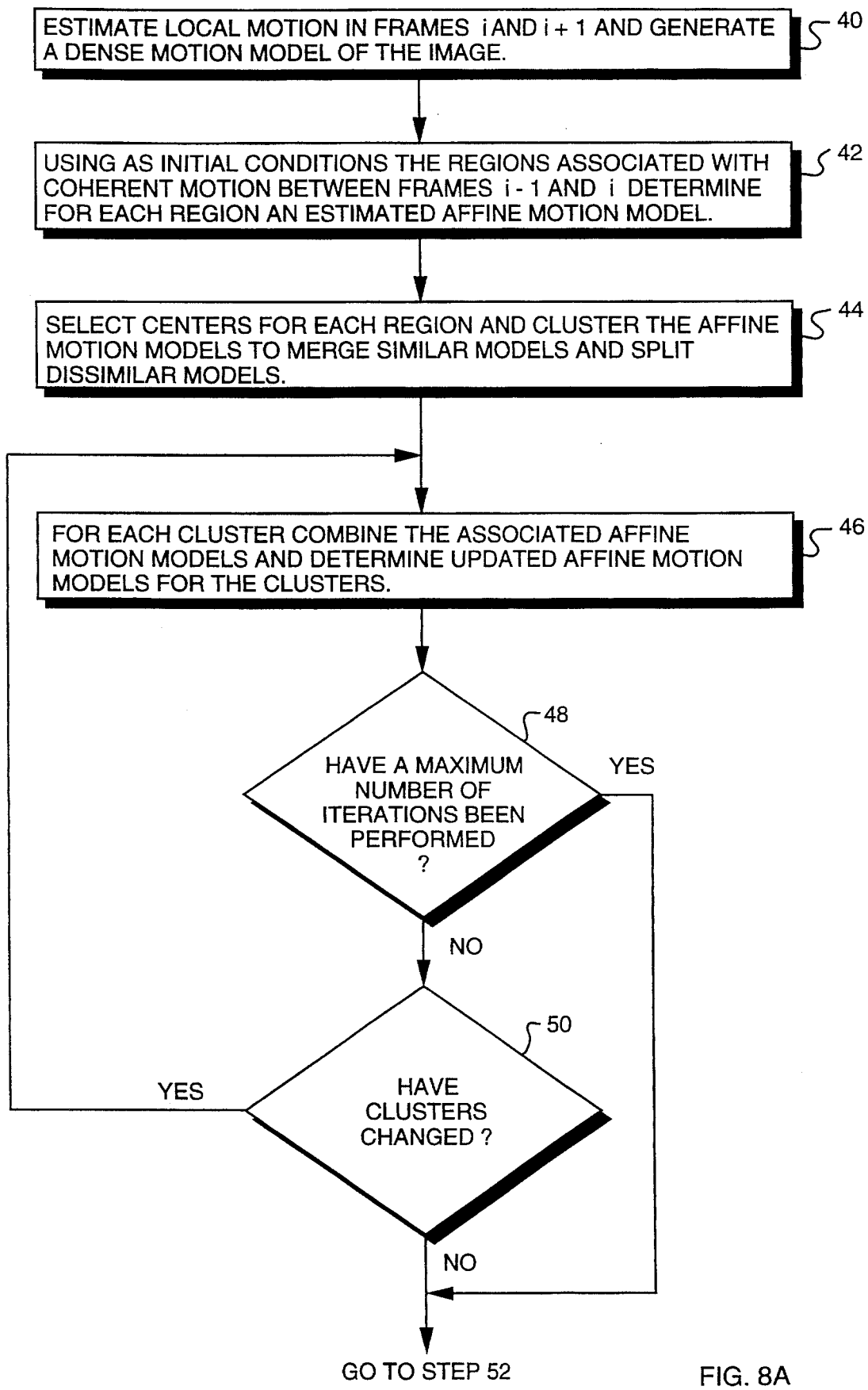
FIG. 8 is a flow chart of the operations of a local motion estimator and a motion segmentation processor included in the system of FIG. 2.
Figure 8B:
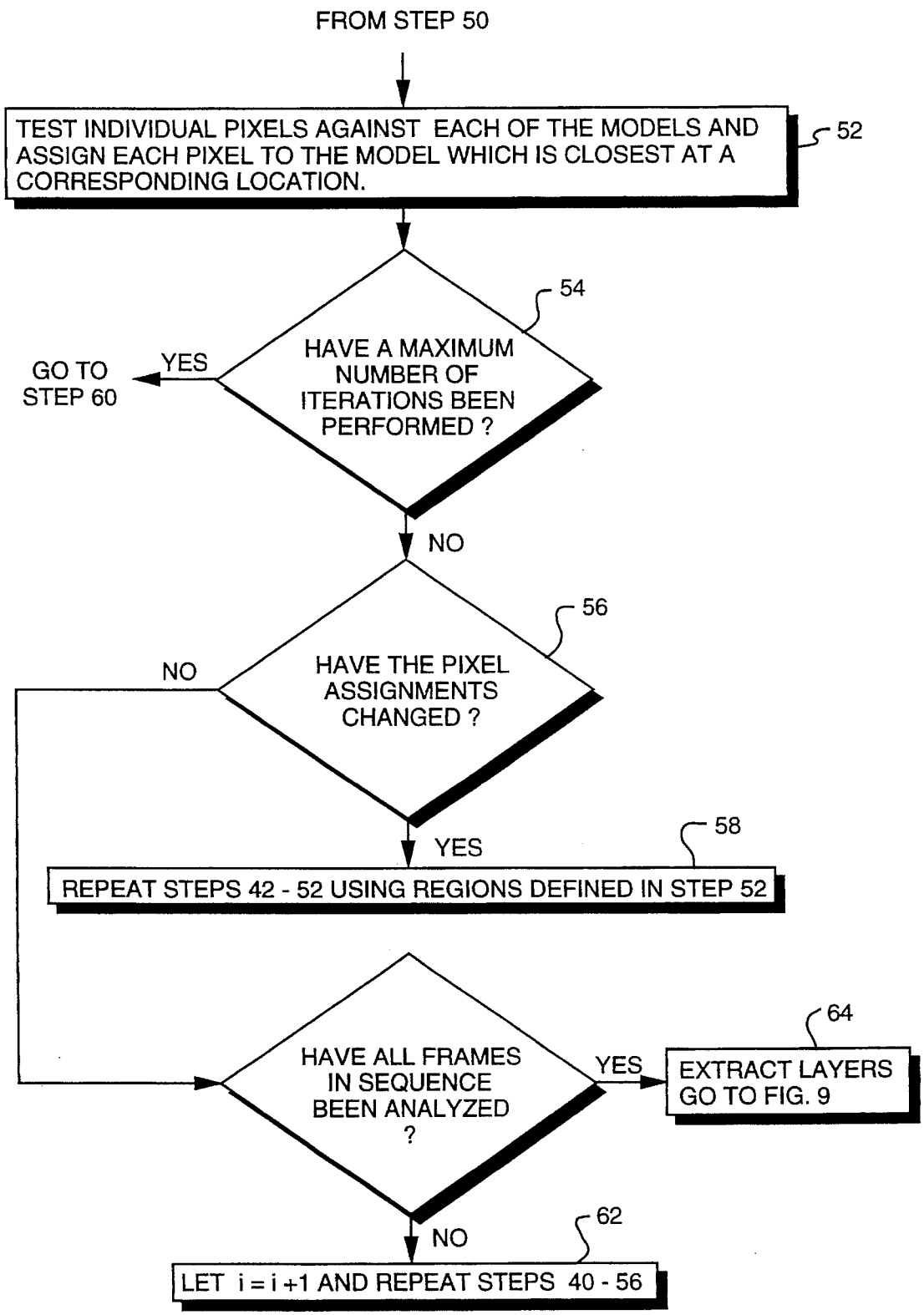

The operations performed by the encoder 10 (FIG. 3) in estimating motion models for successive frame pairs are depicted in a flow chart in FIG. 8. Local motion estimator 22 estimates the local motion of pixels between frames i and i+1 using a multi-scale gradient based technique and produces a dense motion model of the image (step 40). Next, affine motion parameters are determined for the coherent motion regions determined from an analysis of the motions associated with frames i−1 and i (step 42) with arbitrary non-overlapping regions used for analysis of the first pair of frames in the sequence.

The system groups into clusters the motion models which are similar, i.e., which are within a predetermined minimum separation distance in the associated parameter space. New cluster centers are predetermined and clusters with centers which are separated by less than a predetermined distance in affine parameter space are merged and clusters which contain models which are separated by more than a predetermined maximum normalized distance are split into two clusters (step 44). The system 10 next averages the affine motion parameters associated with the models included in a single cluster and produces for each cluster a new center, with a new set of affine parameters (step 46). The clusters are updated by further iterations, until an iteration fails to reassign more than a predetermined number of models or some maximum number of iterations have been performed (steps 46–48).

The system then tests individual pixels against each of the models and associates a pixel with the model which most closely resembles, at a corresponding location, the local motion of the pixel (step 52). If a pixel p is equally close to two or more models, the pixel is assigned to one which is formulated from motion estimates associated with image pixels which are closest to the pixel p. Otherwise, the pixel p is assigned to the model to which the largest number of pixels is assigned. Pixels with local motions which are not approximated by the models to within a predetermined minimum value, for example, ±1 pixel, are treated as unassigned and may be assigned by an analysis of changes in intensity values.

Once updated regions are determined, the affine parameter estimation, clustering and pixel assignment procedures are repeated to further update the regions, and so forth, until either the regions do not change significantly between iterations, or some maximum number of iterations have been performed (steps 54–58). The system then uses the updated regions as initial conditions for analyzing the motions and associated coherent motion regions for a next pair of frames, until all the frame pairs have been analyzed (steps 60–62). As more and more frames are analyzed, the regions of coherent motion become more accurately defined and estimates of associated affine parameters stabilize. Thus the time required to analyze motions in the new frames is reduced.

The affine parameters associated with the regions defined for frames i and i+1 may also be used as motion models for the next frame i+2 in the sequence, to stabilize the system. The parameters may also be used in hypothesis testing, as a predictor of motion. If the same motion continues into the next frame, for example, pixels will be readily assigned to this model and the number of iterations required for convergence is thus reduced.

After regions of coherent motion are identified, the system extracts the corresponding layers using motion compensation (step 64). If the boundaries of a region of coherent motion and the associated affine motion parameters are accurately defined, the corresponding regions in each of the frames can be aligned by warping the images by the appropriate affine transformations. Accordingly, an object, such as the tree of FIG. 1, remains stationary in the appropriately warped sequence of frames, while the flower bed and the row of houses move. The corresponding pixels in the same region in the various frames can be combined and an associated layer intensity value determined for each pixel location in the layer.

The layer contains information which may not be available in any one frame, such as intensity values for pixels in locations which are occluded, assuming that those pixels are not occluded in all of the other frames in the sequence. Otherwise, if the pixel is occluded in every frame, it is not required for correctly encoding the sequence.

Figure 9:
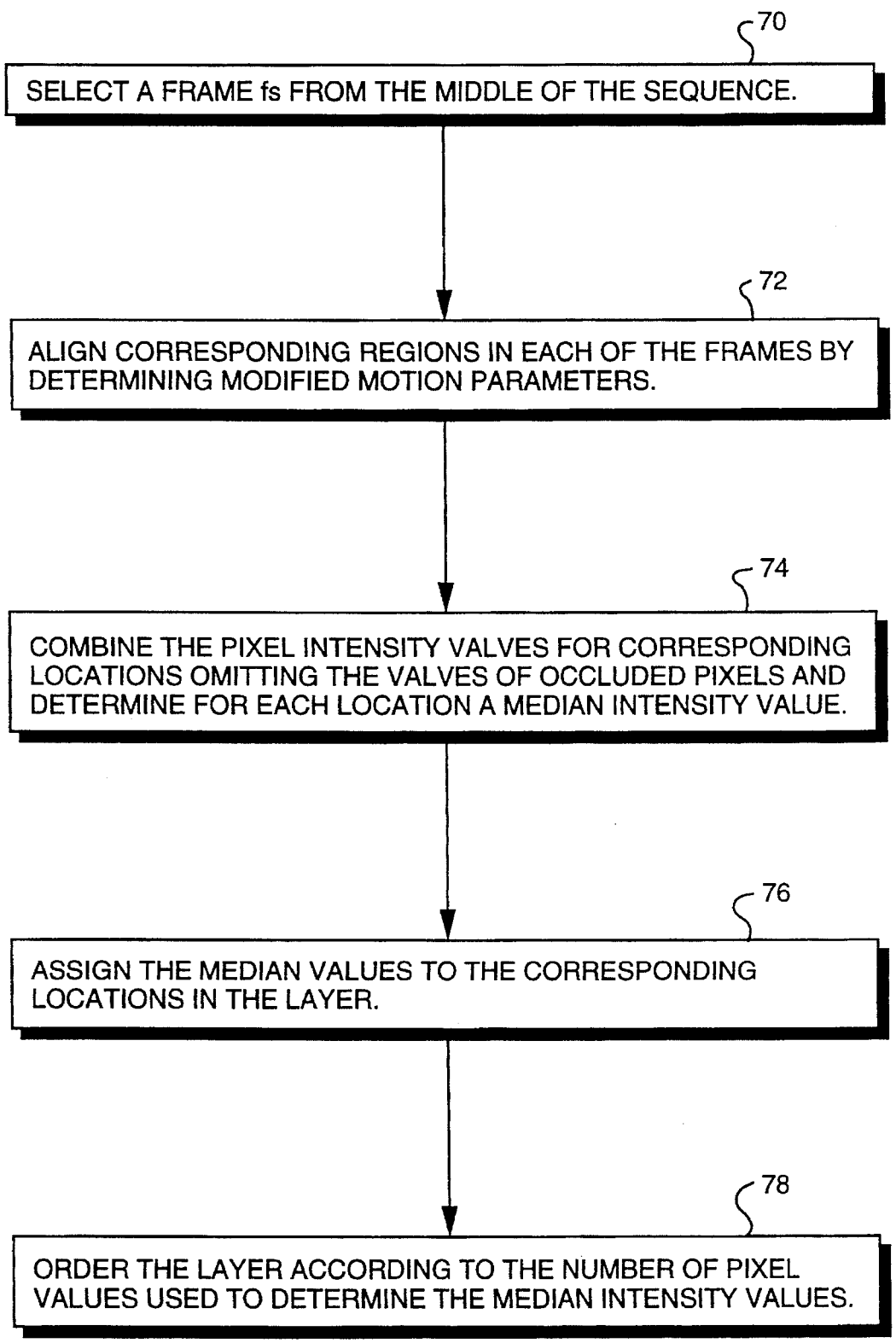
FIG. 9 is a flow chart of the operations of a layer extraction processor included in the system of FIG. 2.

Referring to FIG. 9, to determine the intensity map of a layer, the layer extraction processor 26 (FIG. 3) selects a frame, $f_s$, in the middle of the frame sequence. It next aligns the coherent motion regions in the other frames with the corresponding regions of frame, so that it can combine the pixel information from the various frames to generate a region, or layer, intensity map. To do this, the system modifies the motion parameters associated with the frames in the sequence to produce parameters which describe the motion from the frame to the selected frame (step 72). For a frame i which precedes the selected frame, the system combines the affine parameters $P_i$ associated with the frame i with the affine parameters $P_j$, j=i+1, i+2, . . . s for intervening frames to produce modified parameters $P_{i,s}$ for motion from frame i to frame s. Assuming, for ease of explanation, i=0 and s=2 and thus there is a single intervening frame, and defining $I_2$ as the image and $x_2$ as a pixel location, the modified affine parameters are determined as follows:

$$I_2(x_2) = I_1(x_2 - V_2) \text{ describes a "from-warp"},$$

where $V_2 = A_1 + B_1 x_2$, is the affine transformation and $A_1$ represents the constant affine parameters that go from frame 1 to frame 2 and $B_1$ represents the coefficients of the variable affine parameters that go from frame 1 to frame 2, accordingly $$I_2(x_2) = I_1(x_2 - A_1 - B_1(x_2));$$

and also $$I_1(x_1) = I_0(x_1 - A_0 - B_0(x_1));$$

and thus $$I_2(x_2) = I_0(x_2 - A_{0,2} - B_{0,2}(x_2));$$

where $$A_{0,2} = A_0 + A_1 - B_0 A_1$$

$$B_{0,2} = B_0 + B_1 - B_0 B_1$$

where $A_{0,2}$ represents the constant affine parameters that go from frame 0 to frame 2 and $B_{0,2}$ represents the coefficients of the variable affine parameters that go from frame 0 to frame 2. The parameters for frames which follow the selected frame are calculated as described above, from frame s to a frame j, and the parameters that go from frame j back to frame s are:

$$A_{j,s} = [B_{s,j} - I]^{-1} A_{s,j}$$

$$B_{j,s} = [B_{s,j} - I]^{-1} B_{s,j}$$

where I is the identify matrix.

Using these modified motion parameters, the system aligns the coherent motion region of interest in each of the frames with the same region in frame $f_s$. It then combines the intensity values of corresponding pixel locations in each of the frames, that is, combines them over time, and determines a median intensity value for each location (step 74). The system then assigns these median values to the pixel locations in the layer, which fills-in a pixel intensity value for every location in the layer (step 76).

If a particular pixel location associated with the region of interest is occluded in a frame, its intensity value is omitted from the median value calculation for that region. The system keeps running totals of the number of pixels used to determine the median values for each location (step 78). It then orders the layers, by depth in the image, based on the numbers of contributing pixels. Since an object in the foreground is never occluded, it has a large pixel count associated with every location. Alternatively, objects which are occluded have, for certain locations, fewer contributing pixels. The system can thus order the layers, placing layers with occlusions behind layers with no occlusions.

The system encodes the layers, including in each a pixel intensity map, a set of modified motion parameters and the ordering information. It then stores this information for later decoding and transmission.

The layers provide the system with information which is not available in any one frame of the sequence. For example, referring back to FIG. 1, the flower garden layer 2a includes every pixel of the flower garden, even through the entire garden is not visible in any one frame, of the sequence due to the occluding tree. Similarly, the layer 3a for the row of houses includes pixel information for houses not seen until the end of the sequence. Having all this pixel information, the system can interpolate the motion parameters to generate intermediate frames, as necessary for frame rate conversion. Also, the system can provide the data to recognition systems to enable them to more easily identify objects, by eliminating occlusions before supplying the data. Further, the system can provide the data to recognition systems which identify objects from their motions, supplying such a system with the data relating only to an object of interest.

If the objects are opaque, all image information is contained in the layers and the motion parameters. If one or more regions of the image are transparent, or exhibit "special effects" such as focus or motion blurring, additional information is stored relating to these effects. Also, additional modulation calculations may be required to more accurately represent the changing transparencies at the region edges.

If a region is stationary, or if it is textureless, it is assigned to a single layer which is not transformed from one frame to the next. Any mistakes in assigning motion to such a region cannot be detected, and are thus ignored.

If particular motions cannot accurately be described by the selected motion equations, here affine transformations, error correction information must be included in a layer to control the intensities of the affected pixels. For example, an error map is included in a layer describing an object which, as it rotates, reveals significantly different views of the object.

In brief summary, the system encodes an image into a series of layers by using local motion estimates as part of its analysis to determine regions of coherent motion. The system does not constrain its analysis to dominant motions or small motions. Further it does not assign or arbitrarily restrict object boundaries. Instead, it assigns the individual pixels to motion models which most closely predict their local motion.

By segmenting the image into coherent motion regions, and then assigning each region to a separate layer, the image sequences can be stored as an ordered series of layer maps and an associated set of motion parameters. The image thus uses minimal memory for storage and minimum bandwidth for transmission.

The system includes in each layer an intensity value for every pixel location. Accordingly, the system then has available more image information than is present in any single frame. The system can then use this information to generate sequences of images without a particular object, for example, or generate a frame sequence with a different frame rate, "super-resolution," and so forth. The system may also use the information to perform motion compensated noise reduction without blur.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A computer system for encoding digital image data relating to a sequence of image frames to represent the sequence of image frames as digital data organized as a plurality of ordered layers, the layers including information to be used to reproduce and display the same or an associated sequence of image frames, the system including:
   A. a local motion estimator, for producing local motion estimates for pixel neighborhoods in sequential frames and producing from these estimates associated dense motion models, each of the pixel neighborhoods including a selected pixel and the pixels adjacent to the selected pixel;
   B. a motion segmentation processor, for determining, jointly, from the dense motion models
      i. regions of coherent motion over the entire sequence of frames, and
      ii. for each region of coherent motion a motion model representing the transformation of the region from frame to frame for the sequence of frames;
   C. a layer extraction processor, for forming for each of the regions of coherent motion a layer by associating with the region data that represents the associated image data, the layer including
      i. data representing pixel intensity information relating to the sequence of frames for each of the pixels included in the region,
      ii. data representing an ordering of the layer relative to other layers by depth in the image, the layer extraction processor determining the depth of a layer by determining if pixels in the layer are occluded in any of the frames in the sequence;
      iii. data representing motion information including parameters relating to the motion model associated with the region by the motion segmentation processor, and
   D. means for outputting the digital data comprising the layers to reproduce the same or an associated sequence of frames.

2. The system of claim 1, wherein the motion segmentation processor includes:
   a. a motion estimator for producing estimates of parametric motion models for each of the regions of coherent motion;
   b. a clustering processor which groups similar motion models into clusters and produces for each cluster an estimate of a parametric motion model;
   c. a pixel assignment processor which associates individual pixels with the parametric motion model which most closely represents the local motion estimate associated with the pixel.

3. The system of claim 1, wherein the local motion estimator includes:
   a. a filter for filtering the image data to blur the images, the filtering producing filtered data;
   b. means for subsampling the filtered data to produce lower resolution versions of the images;
   c. means for determining estimates of small motions between selected pixel neighborhoods of the lower resolution versions of the images; and
   d. means for using the estimates of small motions in the lower resolution versions of the images to determine estimates of local motion in associated pixel neighborhoods of the image.

4. The system of claim 1, wherein the system further includes assembling means for assembling the layers produced by said layer extraction processor and producing a sequence of frames, said assembly means selectively assembling all the layers to reproduce the sequence of image frames or less than all of the layers to produce a sequence of frames in which selected regions of coherent motion are excluded.

5. The system of claim 4, wherein the system further includes:
   a. storage means for storing layers extracted from other sequences of image frames,
   b. said assembly means selectively assembling one or more of the layers stored in said storage means and one or more of the layers produced by said layer extraction processor to produce sequences of frames that include regions of coherent motion which are not present in the sequence of image frames.

6. The system of claim 4, wherein said system further includes:
   i. recognition means for identifying objects in the sequence of image frames,
   ii. said assembly means sending to said recognition means a sequence of frames with layers that represent objects that occlude other objects selectively excluded.

7. The system of claim 6, wherein said recognition means includes means for identifying an object by a predetermined characteristic in the image such as shape, intensity pattern, texture or color.

8. The system of claim 4, wherein said assembly means includes means for assembling the layers to produce frames which have wider fields of view than the image frames.

9. The system of claim 1, wherein the system further includes:
   a. interpolation means for interpolating motion parameters associated with the motion models determined by the motion segmentation processor, the interpolation means producing interpolated motion parameters representing inter-frame motion;
   b. frame generation means for generating frames which fall sequentially between the image frames, said frame generation means using the layers produced by the layer extraction processor and the motion parameters produced by the interpolation means to generate additional frames; and
   c. frame rate conversion means for producing a sequence of frames including the image frames and the additional frames, said frame rate conversion means producing a sequence of frames that has a frame rate which is different than the sequence of image frames.

10. The system of claim 9, wherein:
   i. the interpolation means includes means for determining interpolated pixel intensity values for portions of the image frame which are not included in the estimates produced by said local motion estimator, and
   ii. said system further includes frame generation means which uses the interpolation pixel intensity values produced by said interpolation means and the layers produced by said layer extraction processor to produce frames with higher resolution than the image frames.

11. The system of claim 10, wherein the frame generation means accumulates the interpolated pixel intensity values associated with selected frames and produces one or more frames with reduced noise.

12. The system of claim 9, wherein said system further includes:
   i. motion compensation means for manipulating selected frames of the sequence to produce motion-compensated pixel intensity information;
   ii. said frame generation means receiving the motion-compensated pixel intensity information and the layers and producing frames with higher resolution, reduced noise or both.

13. The system of claim 1, wherein said system further includes recognition means for receiving motion models and layers from said motion segmentation processor and said layer extraction processor, respectively, and identifying an object according to the motion of the object.

14. A method of determining regions of coherent motion and associated motions in an image sequence which consists of a plurality of frames and using data associated with the regions of coherent motion to reproduce the same or an associated image sequence, the method comprising the steps of:
   A. estimating local motion of image pixels from frame to frame by determining motion estimates for selected pixels and pixel neighborhoods of the selected pixels;
   B. using the local motion estimates to determine iteratively regions of coherent motion in sequential frames and updating these regions of coherent motion for the plurality of frames; and
   C. for each region of coherent motion determining related motion parameters associated with frame to frame motion, based on the local motion estimates, and updating the motion parameters for updated regions of coherent motion;
   D. segmenting the image into regions of coherent motion by assigning each of the pixels to one or more regions of coherent motion associated with the motion models that most closely represent the local motions of the pixels;
   E. outputting data representing the image sequence as a plurality of regions of coherent motion to reproduce a display of the same or an associated image sequence.

15. The method of determining regions of coherent motion and associated motions of claim 14, wherein the step of estimating local motion of the image pixels includes the steps of:
   a. filtering the image data to blur the images, the filtering producing filtered data;
   b. subsampling the filtered data to produce lower resolution versions of the images;
   c. determining estimates of small motions between selected pixel neighborhoods of the lower resolution versions of the images; and
   d. using the estimates of small motions in the lower resolution versions of the images to determine the estimates of local motion of the pixels.

16. The method of determining regions of coherent motion and associated motions of claim 14, wherein the step of segmenting the image into coherent motion regions includes the steps of:
   a. estimating parametric motion models for each of the regions;
   b. grouping similar parametric motion models into clusters and producing for each cluster an updated affine motion model;
   c. repeating step b a predetermined number of times or until no significant changes to the groupings are made; and
   d. associating individual pixels with the particular motion model produced in step b that most closely resembles the local motion estimate associated with the pixel.

17. The method of determining regions of coherent motion and associated motions of claim 16, wherein the step of segmenting the image into coherent motion regions further includes the steps of:
   e. iteratively updating the estimates of parametric motion models using regions determined by associating individual pixels with the motion models in step d;
   f. iteratively updating the clusters of models using the parametric motion models determined in step e; and
   g. repeating steps a–e until either a maximum number of iterations have been performed or the clusters do not change significantly between successive iterations.

18. The method of determining regions of coherent motion and associated motions of claim 14, wherein the step of segmenting the image into regions of coherent motion further includes segmenting the image into overlapping regions.

19. The method of determining regions of coherent motion and associated motions of claim 14 further including the steps of:
   F. assigning each of the regions of coherent motion to a separate layer; and
   G. determining for each of the pixels in each of the regions of coherent motion a pixel intensity across the plurality of frames and ordering the layers by depth in the image based on a comparison of the intensities of the pixels associated with the various regions;
   H. storing the image sequence as a series of ordered layers with each layer including pixel information, pixel intensities and related motion parameters.

20. The method of claim 19, wherein the method further includes the step of assembling the ordered layers to reproduce the sequence of image frames.

21. The method of claim 20, wherein the step of assembling the layers includes the step of assembling less than all the ordered layers to produce a sequence of frames in which selected layers are excluded.

22. The method of claim 20, wherein the method further includes the steps of:
   a. storing layers extracted from other sequences of image frames; and
   b. assembling one or more of the stored layers and one or more of the ordered layers to produce sequences of frames that include regions of coherent motion which are not present in the image sequence associated with the ordered layers.

23. The method of claim 20, wherein the method further includes:

i. in the step of assembling layers, assembling layers to generate a frame in which objects that occlude other objects are selectively excluded; and ii. identifying an object in the generated frame by shape.

24. The method of claim 20, wherein the step of assembling the layers further includes assembling the layers to produce frames which have wider fields of view than the frames in the image sequence.

25. The method of claim 19, wherein said method further includes the step of analyzing the motion parameters and the layers and identifying an object according to the motion of the object.

26. The method of claim 14, wherein the method further includes the steps of:

a. interpolating motion parameters to produce interpolated motion parameters relating to motion between frames;

b. generating additional frames which fall sequentially between the frames in the image sequence using the regions of coherent motion and the interpolated motion parameters; and c. producing a sequence of frames including the frames of the image sequence and the additional frames to produce a sequence of frames that has a frame rate which is different than that of the image sequence.

27. The method of claim 26, wherein:

i. the step of interpolating motion parameters further includes determining interpolated pixel intensity values for portions of the image for which local motion estimates have not been made; and ii. the step of generating frames further includes using the interpolated pixel intensity values produced in step i and the ordered layers to generate frames with higher resolution than the frames in the image sequence.

28. The method of claim 26, wherein the step of generating frames includes using the interpolated motion parameters to produce a sequence of high-resolution frames with a different frame rate than the image sequence.

29. The method of claim 26, wherein:

i. said step of interpolating motion parameters further includes manipulating selected frames to produce motion-compensated pixel intensity information; and ii. said frame generating step further includes receiving the motion-compensated pixel intensity information and the ordered layers and generating one or more frames with higher resolution, reduced noise or both.

* * * * *